United States Patent [19]

Cahill

[11] Patent Number: 5,545,594
[45] Date of Patent: Aug. 13, 1996

[54] SEMICONDUCTOR SENSOR ANODIC-BONDING PROCESS, WHEREIN BONDING OF CORRUGATION IS PREVENTED

[75] Inventor: Sean S. Cahill, Menlo Park, Calif.

[73] Assignee: Yazaki Meter Co., Ltd., Tokyo, Japan

[21] Appl. No.: 141,054

[22] Filed: Oct. 26, 1993

[51] Int. Cl.[6] .................... H01L 21/46; G01L 9/12; H01G 7/00
[52] U.S. Cl. .................... 437/228; 437/901; 437/927; 73/718; 73/724; 361/283.4
[58] Field of Search ............... 73/721, 724, 718; 361/283; 156/630.1, 633.1; 437/228, 901, 927

[56] References Cited

U.S. PATENT DOCUMENTS

| | | | |
|---|---|---|---|
| 3,800,413 | 4/1974 | Frick | 29/592 |
| 3,983,022 | 8/1976 | Auyang et al. | 257/632 |
| 4,168,517 | 9/1979 | Lee | 73/724 |
| 4,196,632 | 4/1980 | Sikorra | 73/718 |
| 4,301,492 | 11/1981 | Paquin et al. | 361/283 |
| 4,425,799 | 1/1984 | Park | 73/718 |
| 4,458,537 | 7/1984 | Bell et al. | 73/718 |
| 4,467,394 | 8/1984 | Grantham et al. | 361/283 |
| 4,606,228 | 8/1986 | Whitmore | 73/718 |
| 4,609,966 | 9/1986 | Kuisma | 73/724 |
| 4,612,812 | 4/1986 | Broden | 73/718 |
| 4,754,365 | 6/1988 | Kazahaya | 361/283 |
| 4,773,972 | 9/1988 | Mikkor | 73/724 |
| 4,790,192 | 12/1988 | Knecht et al. | 73/721 |
| 4,829,826 | 5/1989 | Valentin et al. | 73/718 |
| 4,872,945 | 10/1989 | Myers et al. | 156/627 |
| 4,905,575 | 3/1990 | Knecht et al. | 92/103 D |
| 4,996,627 | 2/1991 | Zias et al. | 361/283 |
| 5,056,369 | 10/1990 | Tamai et al. | 73/718 |
| 5,114,664 | 5/1992 | Terhune | 376/245 |
| 5,161,532 | 11/1992 | Joseph | 128/635 |
| 5,169,599 | 12/1992 | Joseph et al. | 422/57 |
| 5,177,579 | 1/1993 | Jerman | 257/419 |
| 5,178,015 | 1/1993 | Loeppert et al. | 73/718 |
| 5,209,118 | 5/1993 | Jerman | 73/724 |
| 5,211,058 | 5/1993 | Fukiura et al. | 73/724 |
| 5,216,273 | 6/1993 | Doering et al. | 257/419 |
| 5,264,075 | 11/1993 | Zanini-Fisher et al. | 156/633 |
| 5,277,068 | 1/1994 | Fukiura et al. | 73/724 |
| 5,320,705 | 6/1994 | Fujii et al. | 156/630 |
| 5,323,656 | 6/1994 | Fung et al. | 73/718 |

Primary Examiner—Robert Kunemund
Assistant Examiner—Matthew Whipple
Attorney, Agent, or Firm—Sughrue, Mion, Zinn, Macpeak & Seas

[57] ABSTRACT

A method for bonding a silicon substrate and a glass substrate through an anodic-bonding process, including steps of: forming at least two holes in the glass substrate; forming a recess on the glass substrate, the recess confronting an undesired bonding portion defined in the silicon substrate; depositing a metal layer on the glass substrate with a predetermined pattern; depositing a dielectric layer on the metal layer, the insulating layer covering substantially the entire surface of the metal layer; and bonding the glass substrate and the semiconductor material.

2 Claims, 2 Drawing Sheets

SEMICONDUCTOR SENSOR ANODIC-BONDING PROCESS, WHEREIN BONDING OF CORRUGATION IS PREVENTED

BACKGROUND OF THE INVENTION

1. Field of the Invention

This invention relates to a method and device for manufacturing a semiconductor sensor including a silicon wafer and a glass substrate. More specifically, when a silicon wafer having a diaphragm is bonded with a glass substrate through an anodic bonding process, the glass substrate contains a dielectric material and a recess or a cavity so as to avoid a bond from occurring between the glass substrate and the silicon wafer.

2. Related Art

In FIG. 6, an anodic-bonding process has the following steps. A silicon wafer 201 having a smooth surface 201a and a diaphragm 201b is bonded to a glass substrate 202 (for example, pyrex glass). After that, a unit containing the silicon wafer 201 and the glass substrate 202 is heated in the range of 300° C.–400° C. by a hot plate 204. Under this condition, when a negative voltage within 500–1000 V is applied to the glass substrate 202 by a negative electrode 203, a large electrostatic attracting force is generated between the silicon wafer 201 and the glass substrate 202 so that the chemical bonding occurs between the silicon wafer 201 and the glass substrate 202 at a boundary surface therebetween. However, in the step of applying a voltage to the glass substrate 202, the diaphragm 201b is undesirably bonded to the glass substrate 202 due to the large electrostatic attracting force generated between the silicon wafer 201 and the glass substrate 202.

In view of this problem, in Unexamined Japanese Utility Model Application No. Sho. 3-88137, for example, an oxide layer is formed on both sides of the diaphragm so as to prevent bonding between the diaphragm 201b and the glass substrate 202. However, if this structure is employed, it is difficult to ensure sufficient sensitivity characteristics of the sensor.

SUMMARY OF THE INVENTION

In view of the foregoing problems, one object of the present invention is to provide a method for anodic-bonding a silicon wafer and a glass substrate without bonding undesired portions defined therebetween.

Another object of the present invention is to provide a semiconductor sensor with a dielectric layer and a cavity that are not bonded in the above method for anodic-bonding.

According to one aspect of the present invention, there is provided a semiconductor sensor comprising a semiconductor substrate including: a support member having an opening centrally defined therein; a diaphragm positioned in the opening of the support member; supporting means for supporting and coupling the diaphragm with the support member; a glass substrate having a cavity defined therein in such a manner that the cavity is confronted with the supporting means, the glass substrate including: a metal layer deposited on a surface of the glass substrate; and a dielectric layer deposited on the metal layer, the glass substrate being confronted with the diaphragm.

According to another aspect of the present invention, there is provided a method for bonding a silicon substrate and a glass substrate through an anodic-bonding process, the method comprising the steps of: forming at least two holes in the glass substrate; forming a recess in the glass substrate, the recess being confronted with an undesired bonding portion defined in the silicon substrate; depositing a metal layer onto the glass substrate with the predetermined pattern; depositing a dielectric layer onto the metal layer, the insulating layer covering substantially the whole surface of the metal layer; and bonding the glass substrate and the semiconductor material through a predetermined condition.

According to the present invention, the silicon substrate is bonded to the glass substrate through the anodic-bonding process without bonding the undesired portion of the silicon substrate onto the glass substrate.

According to the present invention, the silicon substrate contains a corrugation so that the displacement of the diaphragm with respect to an applied pressure is increased so as to obtain an increased travel distance per unit of applied force.

DETAILED DESCRIPTION OF THE PREFERRED EMBODIMENT

A preferred embodiment of the present invention will be described below with reference to the drawings.

Figure 5:
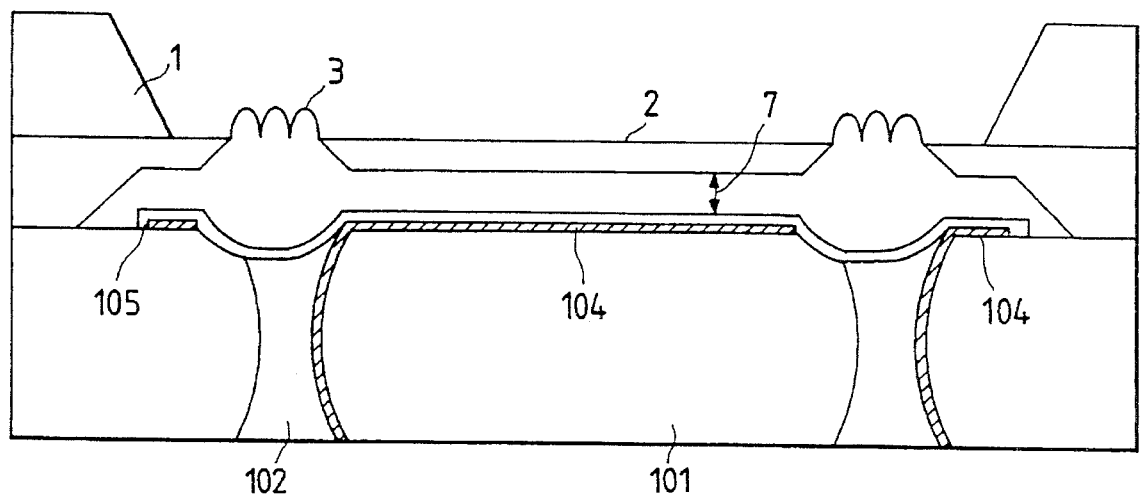
FIG. 5 is a sectional view of a semiconductor sensor of an example of the present invention.
Figure 6:
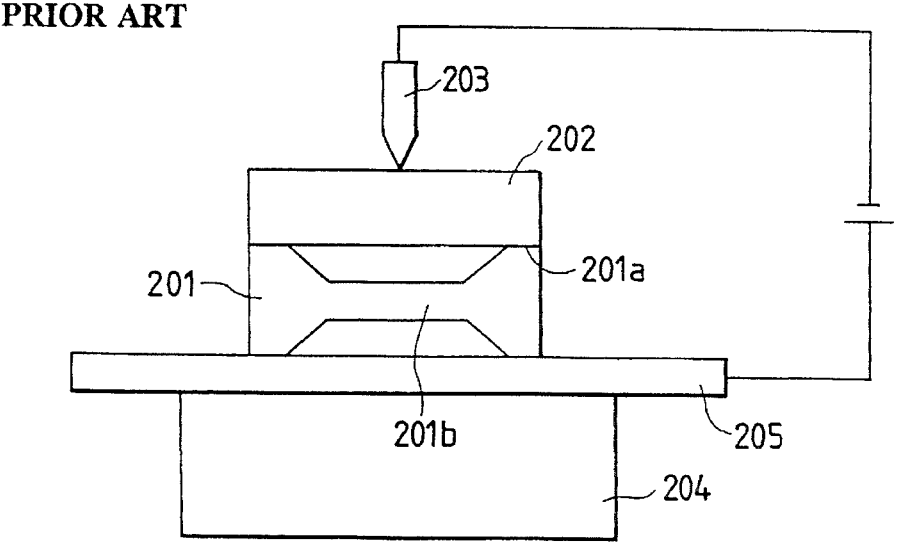
FIG. 6 is a diagram of a conventional anodic bonding process.

One example of a semiconductor sensor of the present invention is shown in FIG. 5. A silicon substrate 1 on which a diaphragm 2 is formed is bonded to the substrate 101 through an anodic-bonding process. A corrugation 3 and the diaphragm 2 are the undesired bonding portions when performing the anodic-bonding process, and are formed on the silicon substrate 1 by a micro machining process.

The glass substrate 101 manufacturing process is shown in FIGS. 1–4 and is described hereinbelow.

Figure 1:
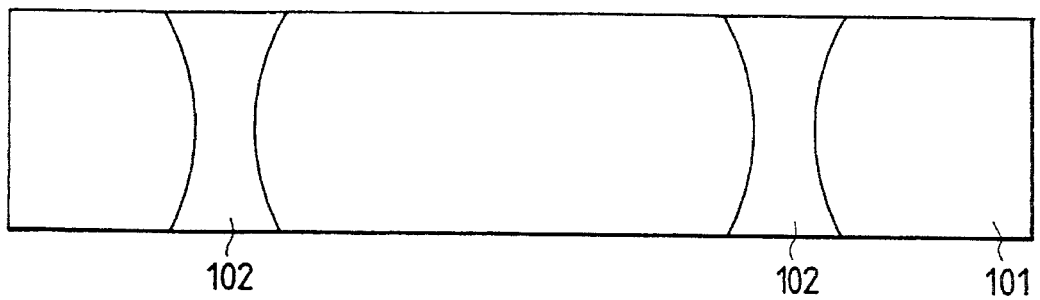
FIGS. 1–4 are sectional views of a process used in anodic bonding of the present invention.
Figure 2:
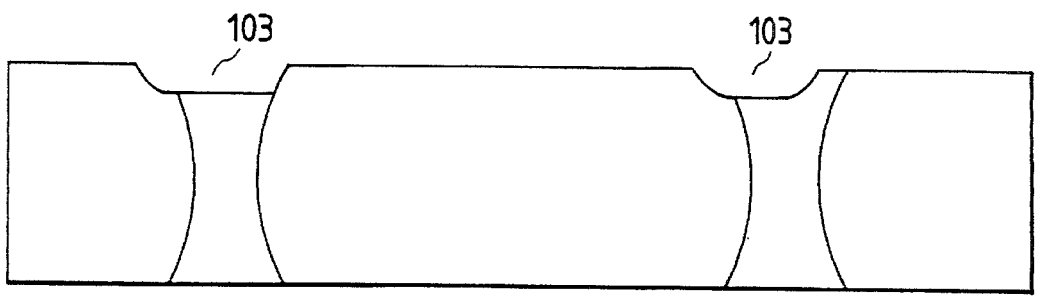

In FIG. 1, two holes 102, 102 are precisely machined in the glass substrate 101 (approximately 400–500 μm in thickness). In FIG. 2, the glass substrate 101 is patterned on a top surface which is confronted with the silicon substrate 1 with a mask for forming a recess 103. The recess 103 is to face the corrugation 3 formed on the substrate 1. This recess 103 prevents the undesired bonding of the corrugation 3 to the glass substrate 101.

Figure 3:
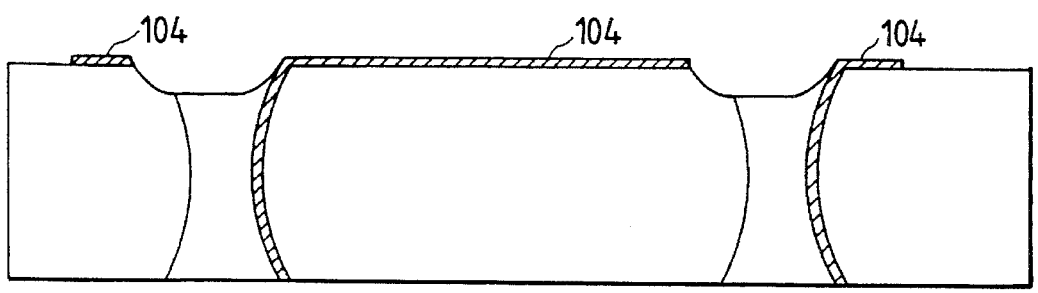

Next, in FIG. 3, a metal, for example aluminum, is evaporated on a top surface of the glass substrate 101 to form a metal layer 104. At this time, a bottom surface and inner portions of the holes 102 are evaporated so as to electrically bond the metal layers formed on the top surface and bottom surface of the glass substrate 101.

Figure 4:
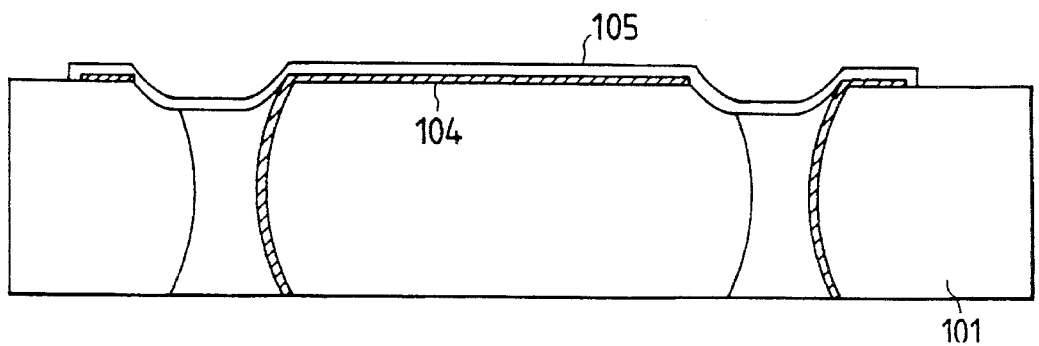

Thereafter, in FIG. 4, a dielectric material, for example alumina, is formed or deposited on a surface of the metal layer 104 facing the silicon substrate 1 to form a dielectric layer 105.

Thus, the silicon substrate 1 is bonded to the glass substrate 101 through the anodic-bonding process. In this anodic bonding, the diaphragm 2 is not bonded to the glass substrate 101 and the corrugation 3 is not bonded to the glass substrate 101.

As described above, according to the present invention, when the silicon substrate is bonded to the glass substrate through the anodic-bonding process, undesired bonding portions at the time of performing the anodic-bonding process, such as the corrugation and the diaphragm, are not bonded to the glass substrate.

Of course, the concept of the present invention is not limited by this embodiment. For instance, the dielectric layer may be formed on a surface of the diaphragm confronting the glass substrate.

According to the present invention, the silicon substrate contains a corrugation so that the displacement of the diaphragm with respect to an applied force is increased so as to obtain an increased travel distance per unit of applied force.

What is claimed is:

1. A method for bonding a silicon substrate (1) and a glass substrate (101) through an anodic-bonding process, the method comprising steps of:

forming a hole (102) in the glass substrate;

forming a recess (103) in a surface of the glass substrate;

depositing a metal layer (104) on the surface of the glass substrate;

depositing a dielectric layer (105) on the metal layer; and anodic-bonding the glass substrate and the silicon substrate so as to form a gap (7) therebetween, wherein the silicon substrate includes a corrugation (3) which flexibly supports a diaphragm (2), and wherein in said step of forming the recess, the recess is formed so as to confront the corrugation to prevent the corrugation from bonding with the glass substrate, the recess extending over only a portion of the surface of the glass substrate substantially confronting the corrugation.

2. A method as recited in claim 1, wherein the corrugation surrounds the diaphragm, and wherein, in said step of forming the recess, the recess is formed so as to circumscribe the diaphragm, the recess confronting the corrugation over all of the corrugation so that no portions of the corrugation are bonded with the glass substrate in said anodic bonding step.

* * * * *